United States Patent
Sugitani et al.

(10) Patent No.: US 7,348,700 B2
(45) Date of Patent: Mar. 25, 2008

(54) AUTOMOTIVE ALTERNATOR HAVING WATER SHIELD FOR PROTECTING BRUSHES FROM WATER DAMAGE

(75) Inventors: Katsuhiko Sugitani, Kariya (JP); Hiroshi Ishida, Anjo (JP); Hitoshi Irie, Nagoya (JP)

(73) Assignee: Denso Corporation, Kariya (JP)

( * ) Notice: Subject to any disclaimer, the term of this patent is extended or adjusted under 35 U.S.C. 154(b) by 97 days.

(21) Appl. No.: 11/252,787

(22) Filed: Oct. 19, 2005

(65) Prior Publication Data
US 2006/0082233 A1    Apr. 20, 2006

(30) Foreign Application Priority Data
Oct. 19, 2004    (JP)    ............................. 2004-303807

(51) Int. Cl.
H02K 5/10    (2006.01)
(52) U.S. Cl. ......................................... 310/88; 310/232
(58) Field of Classification Search .................. 310/85, 310/88, 232, 58, 59
See application file for complete search history.

(56) References Cited

U.S. PATENT DOCUMENTS

| 3,731,126 | A |   | 5/1973  | Hagenlocher et al. |
|-----------|---|---|---------|--------------------|
| 4,939,397 | A |   | 7/1990  | Morrill            |
| 4,959,576 | A | * | 9/1990  | Horibe et al. ............... 310/239 |
| 5,424,600 | A | * | 6/1995  | Ishikawa et al. ............ 310/220 |
| 5,550,418 | A | * | 8/1996  | Chung ........................ 310/239 |
| 5,998,903 | A | * | 12/1999 | Umeda et al. ............... 310/179 |
| 6,060,802 | A |   | 5/2000  | Masegi et al.      |
| 6,294,856 | B1 | * | 9/2001 | Ishida et al. ................ 310/232 |
| 6,426,575 | B1 | * | 7/2002 | Masegi et al. ............ 310/68 D |
| 6,486,584 | B2 | * | 11/2002 | Chang ........................ 310/239 |
| 6,515,398 | B1 |   | 2/2003 | Fudono et al.     |
| 6,617,717 | B2 | * | 9/2003 | Okawa ........................ 310/59 |
| 6,724,108 | B2 | * | 4/2004 | Nakano .................... 310/68 D |

(Continued)

FOREIGN PATENT DOCUMENTS

JP    U-58-051663    4/1983

(Continued)

OTHER PUBLICATIONS

K. Onya et al.; "Rotary Electrical Machine of Explosion-Proof Type"; Journal of Denso Technical Disclosure; Apr. 15, 1995; p. 68. (w/ partial translation).

*Primary Examiner*—Dang Le
(74) *Attorney, Agent, or Firm*—Oliff & Berridge, PLC

(57) ABSTRACT

An automotive alternator according to the present invention includes a rotary shaft, slip rings, a brush holder, brushes, a cover, a seal member, a cooling air flow path, and a water shield. The slip rings are fixed to an end portion of the rotary shaft. The brushes are accommodated in the brush holder and so held by the brush holder as to establish sliding contacts with the slip rings to excite the automotive alternator. The cover covers the end portion of the rotary shaft, the slip rings, the brush holder, and the brushes. The seal member is interposed between the brush holder and the cover. The cooling air flow path is formed between the seal member and one of the brush holder and the cover to supply cooling air to the brushes. The water shield works to prevent water from entering into an entrance of the cooling air flow path.

6 Claims, 4 Drawing Sheets

U.S. PATENT DOCUMENTS

| | | |
|---|---|---|
| 6,740,995 B2 * | 5/2004 | Oohashi et al. ........... 310/68 D |
| 2002/0036439 A1 * | 3/2002 | Ooiwa ....................... 310/207 |
| 2002/0047465 A1 | 4/2002 | Chang |
| 2002/0047470 A1 | 4/2002 | Shioya et al. |
| 2004/0207275 A1 * | 10/2004 | Sakakibara et al. ........... 310/58 |

FOREIGN PATENT DOCUMENTS

| | | |
|---|---|---|
| JP | B2-07-032571 | 4/1995 |
| JP | B2-3232706 | 9/2001 |
| JP | A 2002-345198 | 11/2002 |

* cited by examiner

AUTOMOTIVE ALTERNATOR HAVING WATER SHIELD FOR PROTECTING BRUSHES FROM WATER DAMAGE

CROSS-REFERENCE TO RELATED APPLICATION

This application claims priority from Japanese Patent Application No. 2004-303807, filed on Oct. 19, 2004, the content of which is hereby incorporated by reference into this application.

BACKGROUND OF THE INVENTION

1. Technical Field of the Invention

The present invention relates generally to alternators and chagrining systems for automobiles. More particularly, the invention relates to an automotive alternator that has a water shield for protecting brushes of the alternator from water damage.

2. Description of the Related Art

Conventional automotive alternators generally include a rotor mounted on a rotary shaft of the alternator, a stator surrounding the rotor, and a housing that accommodates the rotor and stator.

The rotary shaft has cooling fans fixed thereto, which create cooling air flow with rotation of the shaft. The housing has discharge openings formed therein, through which the cooling air flows out from the housing.

The rotary shaft also has slip rings fixed thereto, which are electrically connected with the rotor and in sliding contact with brushes. The brushes are secured in a brush holder that is fixed to the housing. The slip rings and brushes together form an excitation mechanism by which field current is provided to the rotor while the rotary shaft is rotating.

Additionally, there is provided a rear cover to cover the brush assembly and electrical components, such as a rectifier assembly and a voltage regulator.

In such automotive alternators, it is required to provide a cooling air flow path, through which cooling air can be supplied to the brushes to suppress wear of the brushes due to increase of temperature.

For example, Japanese Utility Model First Publication No. S58-51663 discloses an automotive alternator, in which a groove with the shape of a labyrinth is formed on an end face of a brush holder, so as to provide a cooling air flow path between the brush holder and a seal member.

Japanese Patent Second Publication No. H07-32571, an English equivalent of which is U.S. Pat. No. 4,959,576, discloses an automotive alternator, in which a cooling air flow path is formed within a seal member that is interposed between a brush holder and a rear cover.

Japanese Patent No. 3232706, an English equivalent of which is U.S. Pat. No. 5,424,600, discloses an automotive alternator, in which a groove with the shape of a labyrinth is formed on an end face of a seal member, so as to provide a cooling air flow path between the seal member and a brush holder.

Further, in automotive alternators, it is also required to prevent brushes from water damage. Accordingly, automotive alternators, which have a cooling air flow path formed therein, are required to be so installed in an automobile as to prevent the entrance of the cooling air flow path from being oriented in the direction of a water flow or a water drop in the automobile.

However, recent automotive alternators have become to be installed in automobiles with various orientations. Consequently, in some cases, it is difficult to prevent the entrance of cooling air flow path in an automotive alternator from opening in the direction of water flow or water drop with a standard seal member or brush holder. Accordingly, in such cases, it is necessary to use a special seal member or brush holder depending on the orientation of the automotive alternator in the automobile, thus increasing manufacturing cost of the automotive alternator.

SUMMARY OF THE INVENTION

The present invention has been made in view of the above-mentioned problem.

It is, therefore, a primary object of the present invention to provide an automotive alternator which has a cooling air flow path directed to brushes of the alternator and includes a water shield that can reliably prevent water from entering into the entrance of the cooling air flow path in a wide feasible range of orientation for the alternator.

According to the first aspect of the invention, an automotive alternator is provided which includes a rotary shaft, slip rings, a brush holder, brushes, a cover, a seal member, a cooling air flow path, and a water shield.

The rotary shaft has an end portion. The slip rings are fixed to the end portion of the rotary shaft. The brushes are accommodated in the brush holder and so held by the brush holder as to establish sliding contacts with the slip rings to excite the automotive alternator. The cover covers the end portion of the rotary shaft, the slip rings, the brush holder, and the brushes. The seal member is interposed between the brush holder and the cover. The cooling air flow path is formed between the seal member and one of the brush holder and the cover to supply cooling air to the brushes. The water shield works to prevent water from entering into an entrance of the cooling air flow path.

With the above arrangement, it is possible to supply cooling air to the brushes, while preventing water from entering into the entrance of the cooling air flow path by means of the water shield.

According to the second aspect of the invention, in the above automotive alternator, the seal member includes a base portion and an extension portion that extends radially outwardly from part of an outer circumference of the base portion. Moreover, the cooling air flow path is formed between the base portion of the seal member and the cover, and the water shield is formed by the extension portion of the seal member and the cover.

Since the water shield is obtained by utilizing part of the seal member (i.e., the extension portion), it becomes possible to reduce the number of parts in the automotive alternator and reliably prevent water from entering into the cooling air flow path from the interface between the water shield and the cooling air flow path.

According to the third aspect of the invention, in the above automotive alternator, an end face of the extension portion of the seal member is partially brought into abutment with an inner face of the cover to form the water shield. Moreover, the water shield has an extension path formed therein which has an open end and a closed end. The extension path extends from the closed end to the open end across the entrance of the cooling air flow path, so that the cooling air flow path communicates with the extension path at a place close to the closed end of the extension path, and the open end of the extension path and the entrance of the cooling air flow path open in different directions.

Since the water shield has the extension path formed therein, the whole cooling air flow path to the brushes is extended, and thus the labyrinth effect of the cooling air flow path on protection of the brushes from foreign matter is enhanced.

Moreover, since the open end of the extension path and the entrance of the cooling air flow path open in different directions, it is possible to reliably prevent water from entering into the cooling air flow path even when the automotive alternator is so installed in an automobile that the entrance of the cooling air flow path opens in the direction of a water flow or a water drop in the automobile. Consequently, the feasible range of orientation for the automotive alternator in the automobile is increased.

According to the fourth aspect of the invention, in the above automotive alternator, the base portion of the seal member has an end face on which protrusions are formed with the same protruding length so that a groove having a plurality of curves is provided between the protrusions. Moreover, the end face of the base portion of the seal member is brought into abutment with an inner face of the cover to form therebetween the cooling air flow path which has the shape of a labyrinth.

Since the cooling air flow path has the shape of a labyrinth, it is possible to reliably prevent foreign matter (e.g., muddy water) that has accidentally entered into the cooling air flow path from reaching to the brushes.

BRIEF DESCRIPTION OF THE DRAWINGS

The present invention will be understood more fully from the detailed description given hereinafter and from the accompanying drawings of the preferred embodiment of the invention, which, however, should not be taken to limit the invention to the specific embodiment but are for the purpose of explanation and understanding only.

In the accompanying drawings.

DESCRIPTION OF THE PREFERRED EMBODIMENT

Figure 1:
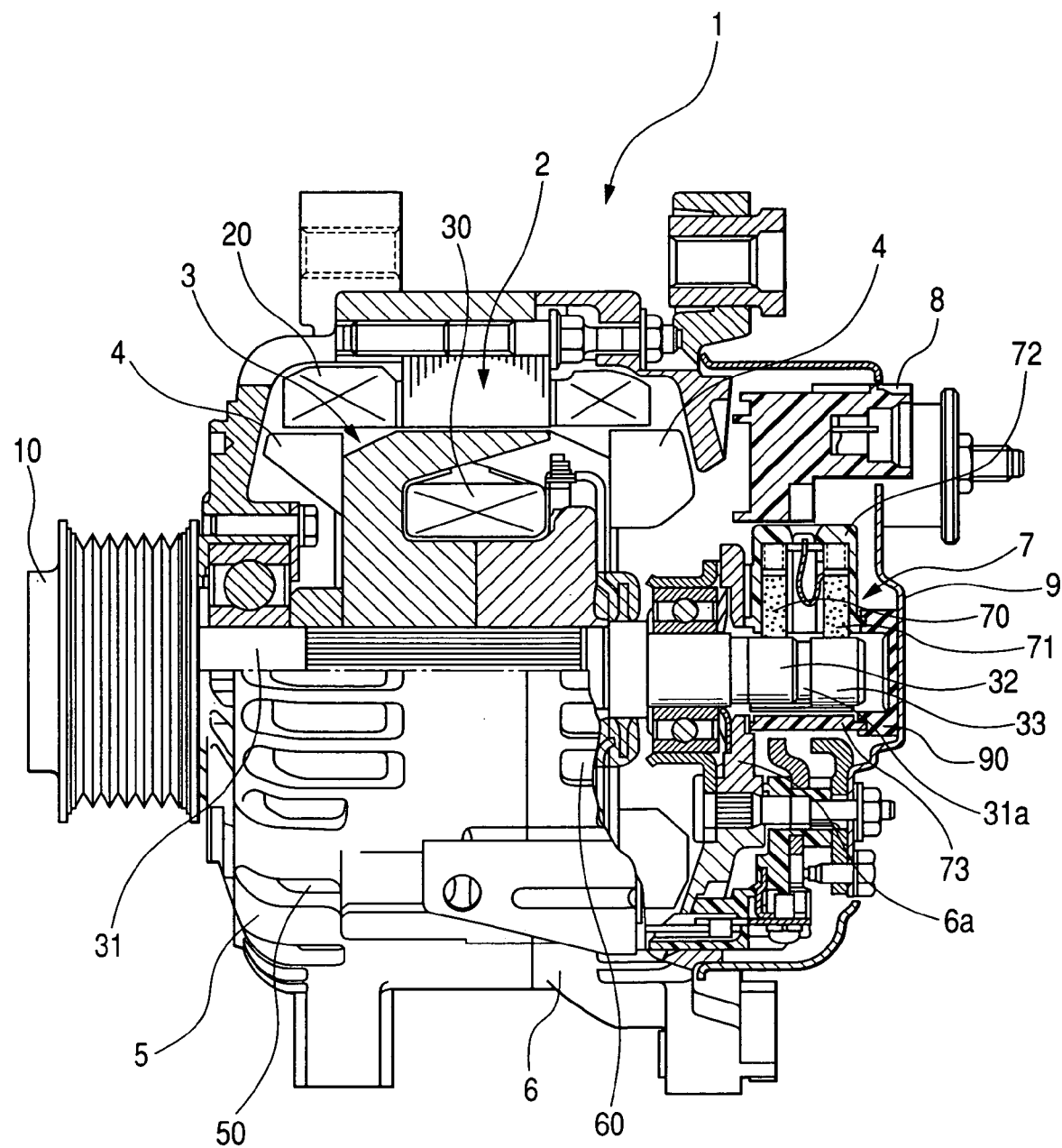
FIG. 1 is a front elevational view of an automotive alternator according to an embodiment of the invention.
Figure 2:
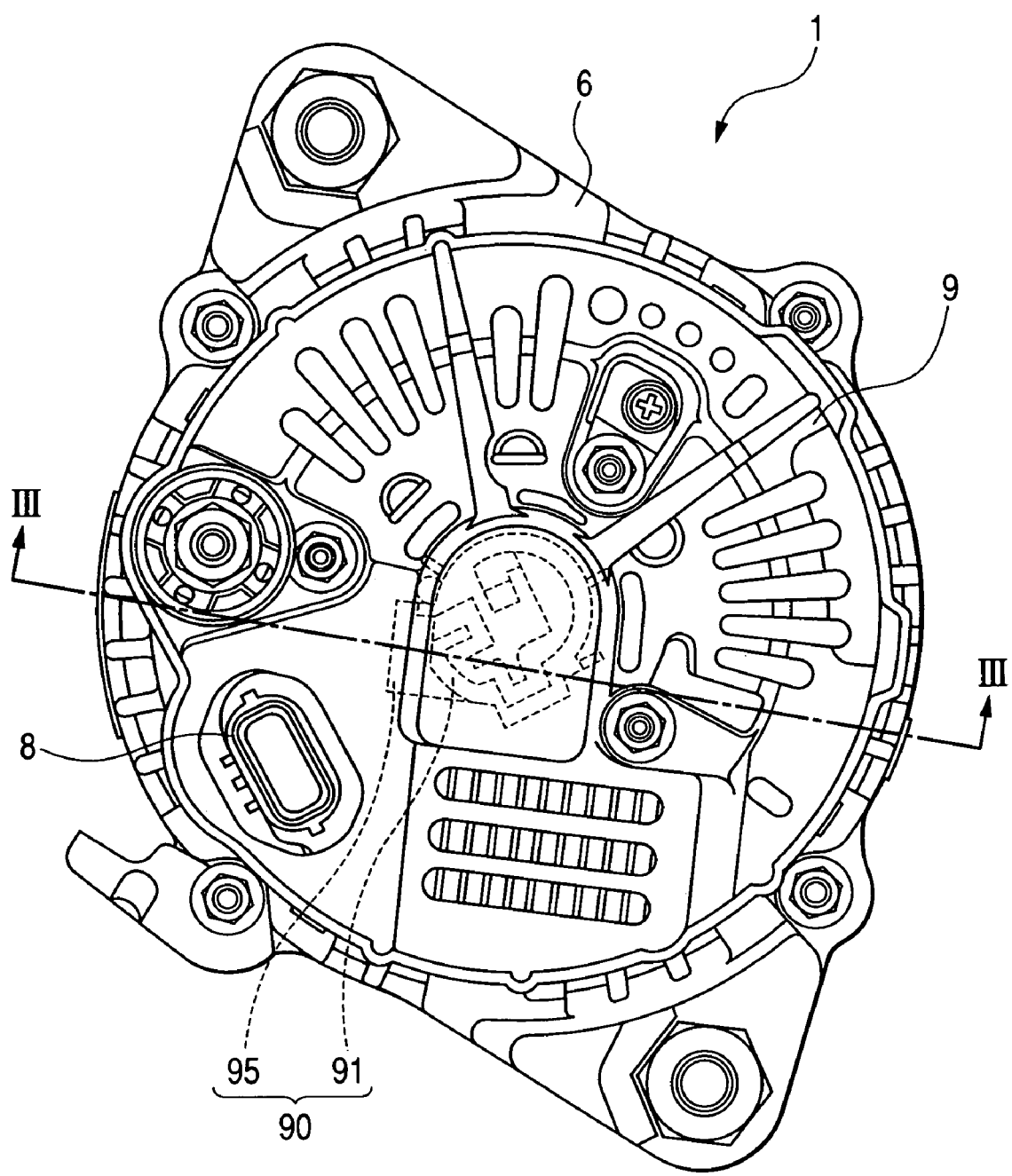
FIG. 2 is a side elevational view of the automotive alternator of FIG. 1.

The preferred embodiment of the present invention will be described hereinafter with reference to FIGS. 1-6.

It should be noted that, for the sake of clarity and understanding, identical components having identical functions have been marked, where possible, with the same reference numerals in each of the figures.

FIG. 1 shows the overall configuration of an automotive alternator (or generator) 1 according to an embodiment of the present invention.

As shown in FIG. 1, the automotive alternator 1 includes a stator 2, a rotor 3, a pair of cooling fans 4, a front housing 5, a rear housing 6, a brush assembly 7, a voltage regulator 8, a rear cover 9, and a pulley 10.

The stator 2 includes a stator winding 20. The rotor 3, which includes a field winding 30, is mounted on a rotary shaft 31 and surrounded by the stator 2. The cooling fans 4 are also mounted on the rotary shaft 31, each of which is located close to one of the two axial ends of the rotor 3, respectively. The cooling fans 4 work to create cooling air flow with rotation of the rotary shaft 31.

The front housing 5 and rear housing 6 are joined together to accommodate therein the stator 2, rotor 3, and cooling fans 4. The front housing 5 has a plurality of ventilation openings 50 formed therein, through which the cooling air flow created by the cooling fan 4 located in the front housing 5 is to pass. Similarly, the rear housing 6 has a plurality of ventilation openings 60 formed therein, through which the cooling air flow created by the cooling fan 4 located in the rear housing 6 is to pass. The rear housing 6 also has a rear wall 6a, through which an end portion 31a of the rotary shaft 31 extends outside the rear housing 6.

The brush assembly 7 is composed of brushes 70 and 71, a brush holder 72 that accommodates the brushes 70 and 71, and a slip ring cover 73. The brushes 70 and 71 are so held by the brush holder 72 as to establish sliding contacts with slip rings 32 and 33. The slip rings 32 and 33 are mounted on the end portion 31a of the rotary shaft 31 and electrically connected with the field winding 30 of the rotor 3. The brushes 70 and 71 and slip rings 32 and 33 together form an excitation mechanism by which field current is supplied to the field winding 30 while the rotor 3 is rotating. The slip ring cover 73 is provided to surround, together with the brush holder 72, the outer periphery of the slip rings 32 and 33.

The voltage regulator 8 is configured to regulate an output voltage of the automotive alternator 1 to a predetermined value.

The rear cover 9 is provided to cover the brush assembly 7 and electrical components including the voltage regulator 8, so as to prevent those from foreign matter. Between the rear cover 9 and the brush assembly 7, there is provided a seal member 90 that is made, for example, of rubber.

The pulley 10 is mounted on the rotary shaft 31 and works to transmit driving force from an engine (not shown) to the rotary shaft 31.

Referring now to FIGS. 2-6, the seal member 90 includes a base portion 91, which has the shape of a disc, and an extension portion 95 that extends radially outwardly from part of an outer circumference of the base portion 91.

The base portion 91 of the seal member 90 has a first end face, on which protrusions 92 are formed with the same protruding length so that a groove having a plurality of curves is provided between the protrusions 92. The first end face of the base portion 91 is brought into abutment with an inner face of a central flat portion 96 of the rear cover 9, so that a cooling air flow path 93 is formed between the first end face of the base portion 91 and the inner face of the central flat portion 96. The cooling air flow path 93 has the shape of a labyrinth and two opposite ends in the lengthwise direction thereof. Specifically, the radially outer end of the cooling air flow path 93 makes up an entrance 94 of the same; the radially inner end of the cooling air flow path 93 makes up an exit 81 of the same. The exit 81 of the cooling air flow path 93 communicates with an internal space around the slip rings 32 and 33, which is surrounded by the brush assembly 7.

The base portion 91 of the seal member 90 has also a second end face, on which a ring-shaped groove 80 is provided. The groove 80 is deformed, during assembly of the automotive alternator 1, in a direction along which the rear cover 9 is pressed against the brush assembly 7, so that the airtightness between an end face of the brush assembly 7 and the second end face of the base portion 91 is secured.

The extension portion 95 of the seal member 90 has a flat end face that connects with the first end face of the base portion 91. On the other hand, the rear cover 9 includes a flat portion 98, which is formed in the outer periphery of the central flat portion 96, and a slope portion 97 formed between the flat portions 96 and 98. The end face of the extension portion 95 of the seal member 90 is partially brought into abutment with an inner face of the flat portion 98 of the rear cover 9, thereby forming a water shield 11 that works to prevent water from entering into the entrance 94 of the cooling air flow path 93.

Figure 3:
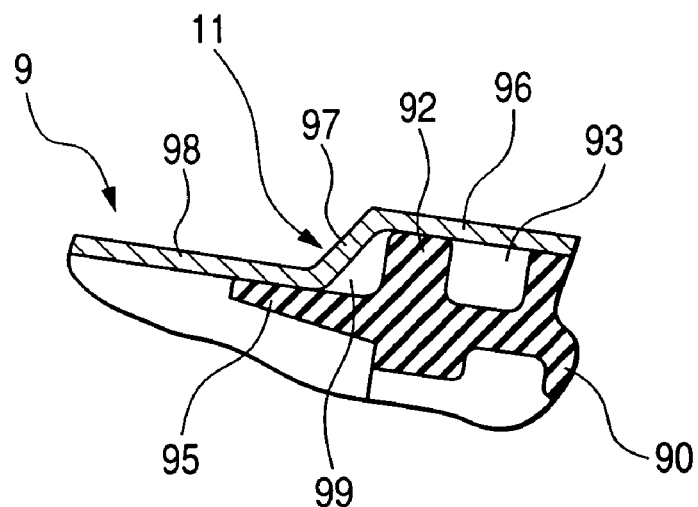
FIG. 3 is a cross sectional view, taken along the line III-III in FIG. 2, illustrating formation of a cooling air flow path and a water shield in the automotive alternator of FIG. 1.
Figure 4:
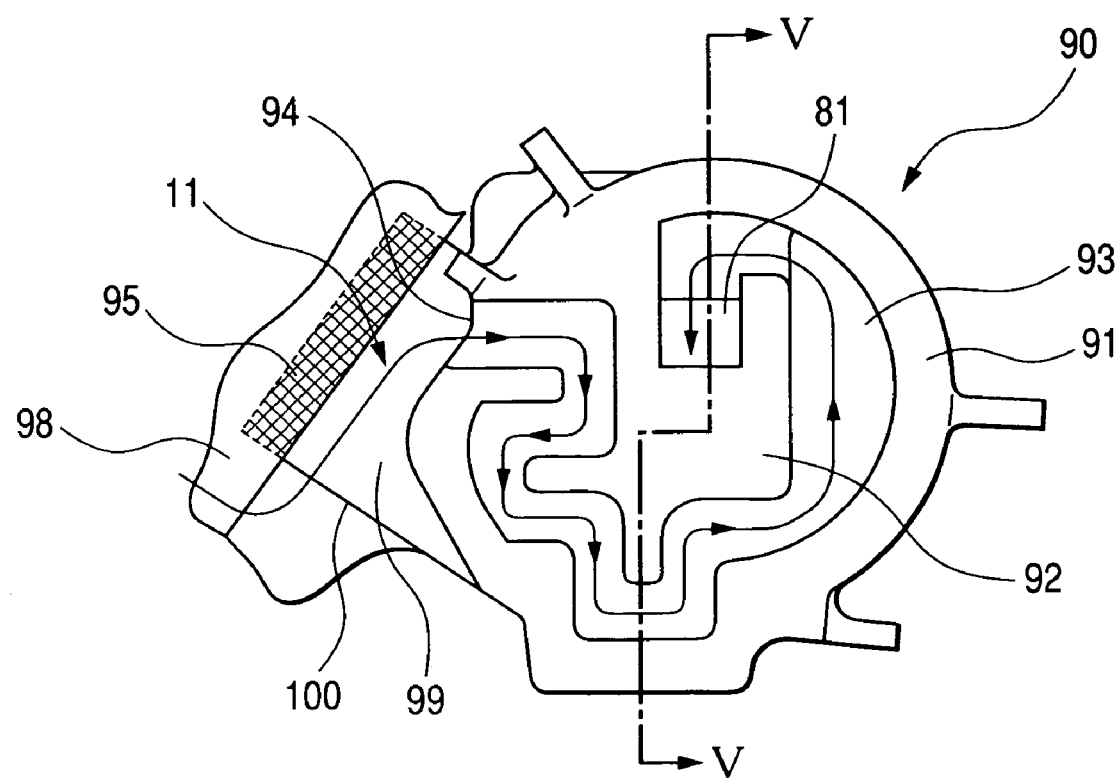
FIG. 4 is a side elevational view of a seal member of the automotive alternator of FIG. 1.
Figure 5:
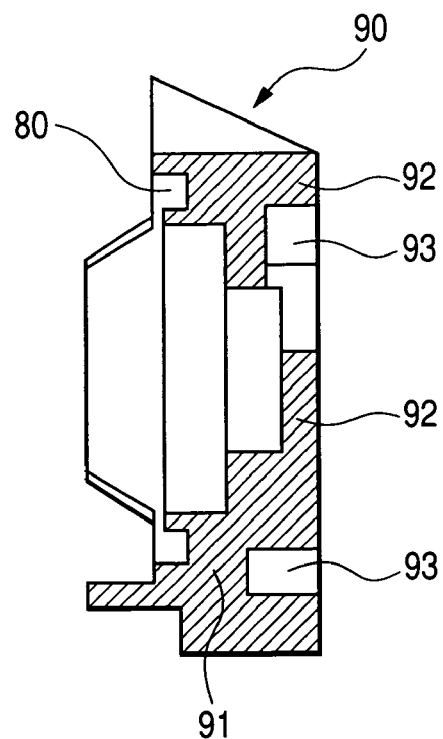
FIG. 5 is a cross sectional view, taken along the line V-V in FIG. 4, showing the internal structure of the seal member of FIG. 4.
Figure 6:
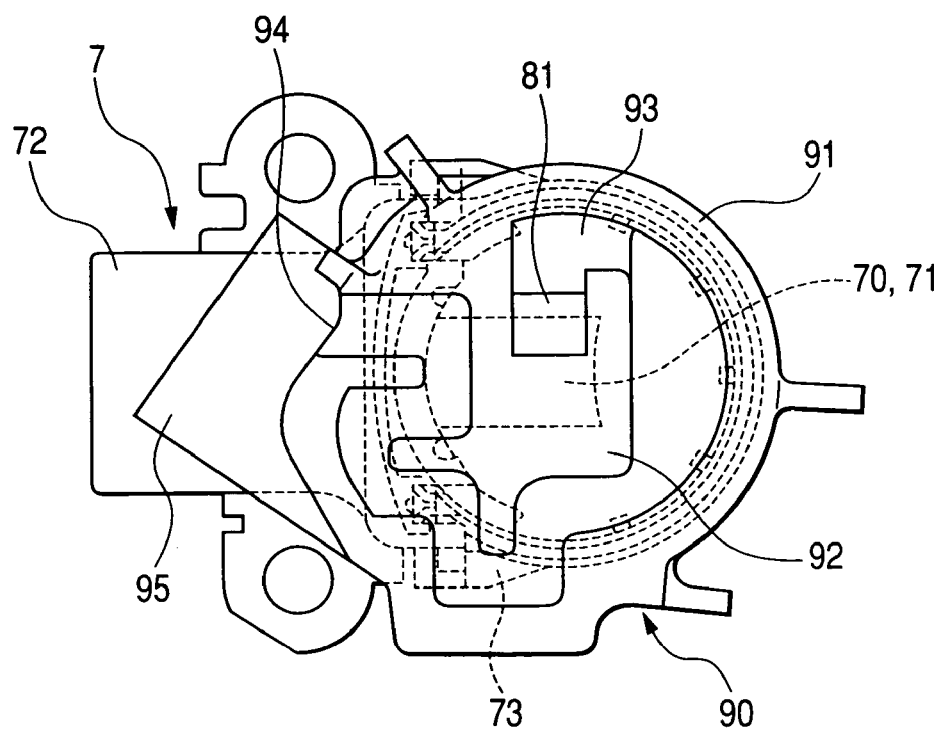
FIG. 6 is a side elevational view showing the seal member and a brush assembly of the automotive alternator of FIG. 1 in the assembled state.

Specially, as shown in FIGS. 3 and 4, the water shield 11 has an extension path 99 formed therein, which is surrounded by the end face of the extension portion 95 of the seal member 90, an inner face of the slope portion 97 of the rear cover 9, the inner face of the central flat portion 96 of the rear cover 9, and side faces of the protrusions 92 on the first end face of the base portion 91. The extension path 99 has an open end, which makes up an entrance 100 of the extension path 99, and a closed end. The extension path 99 extends from the closed end to the open end across the entrance 94 of the cooling air flow path 93, so that the cooling air flow path 93 communicates with the extension path 99 at a place close to the closed end, and the entrance 100 of the extension path 99 and the entrance 94 of the cooling air flow path 93 open in different directions. Consequently, the whole cooling air flow path for supplying cooling air to the brushes 70 and 71 is extended by the extension path 99.

To sum up, the automotive alternator 1 according to the present embodiment includes the cooling air flow path 93, which is formed between the base portion 91 of the seal member 90 and the rear cover 9, and the water shield 11 that is formed by the extension portion 95 of the seal member 90 and the rear cover 9.

Consequently, it is possible to supply cooling air to the brushes 70 and 71, while preventing water from entering into the entrance 94 of the cooling air flow path 93 by means of the water shield 11.

Moreover, since the water shield 11 is obtained by utilizing part of the seal member 90 (i.e., the extension portion 95), it becomes possible to reduce the number of parts in the automotive alternator 1 and reliably prevent water from entering into the cooling air flow path 93 from the interface between the water shield 11 and the cooling air flow path 93.

Further, the water shield 11 has the extension path 99 formed therein, by which the whole cooling air flow path to the brushes 70 and 71 is extended, and thus the labyrinth effect of the cooling air flow path on protection of the brushes 70 and 71 from foreign matter is enhanced.

Furthermore, since the entrance 100 of the extension path 99 and the entrance 94 of the cooling air flow path 93 open in different directions, it is possible to reliably prevent water from entering into the cooling air flow path 93 even when the automotive alternator 1 is so installed in an automobile that the entrance 94 opens in the direction of a water flow or a water drop in the automobile. Consequently, the feasible range of orientation for the automotive alternator 1 in the automobile is increased.

In addition, since the cooling air flow path 93 has the shape of a labyrinth, it is possible to reliably prevent foreign matter (e.g., muddy water) that has accidentally entered into the cooling air flow path 93 from reaching the inside of the brush assembly 7.

While the above particular embodiment of the invention has been shown and described, it will be understood by those who practice the invention and those skilled in the art that various modifications, changes, and improvements may be made to the invention without departing from the spirit of the disclosed concept.

For example, in the previous embodiment, the cooling air flow path 93 is provided between the seal member 90 and the rear cover 9, However, the cooling air flow path 93 may also be provided between the seal member 90 and the brush holder 72.

Moreover, in the previous embodiment, the water shield 11 is formed by means of the seal member 90 and the rear cover 9.

However, the water shield 11 may also be provided as an independent part without utilizing the seal member 90 and the rear cover 9.

Furthermore, in the previous embodiment, the extension portion 95 of the seal member 90 is designed to extend radially outwardly from part of the outer circumference of the base portion 91.

However, the extension portion 95 may also be designed to extend not only radially outwardly, but also axially toward the rotor 3, from part of the outer circumference of the base portion 91.

Such modifications, changes, and improvements within the skill of the art are intended to be covered by the appended claims.

What is claimed is:

1. An automotive alternator comprising:
a rotary shaft having an end portion;
slip rings fixed to said end portion of said rotary shaft;
a brush holder;
brushes accommodated in said brush holder, said brushes being so held by said brush holder as to establish sliding contacts with said slip rings to excite the automotive alternator;
a cover covering said end portion of said rotary shaft, said slip rings, said brush holder, and said brushes;
a seal member interposed between said brush holder and said cover, said seal member having a base portion and an extension portion that extends radially outward from part of an outer circumference of said base portion, wherein said base portion is formed substantially in a disk like shape;
a cooling air flow path, formed between said base portion of said seal member and said cover, having a labyrinth shape, to supply cooling air to said brushes; and
a water shield formed by said extension portion of said seal member and said cover to prevent water from entering into an entrance of said cooling air flow path.

2. The automotive alternator as set forth in claim 1, wherein an end face of said extension portion of said seal member is partially brought into abutment with an inner face of said cover to form said water shield.

3. The automotive alternator as set forth in claim 2, wherein said water shield has an extension path formed therein which has an open end and a closed end, and wherein said extension path extends from said closed end to said open end across said entrance of said cooling air flow path, so that said cooling air flow path communicates with said extension path at a place close to said closed end of said extension path, and said open end of said extension path and said entrance of said cooling air flow path open in different directions.

4. The automotive alternator as set forth in claim 1 wherein said base portion of said seal member has an end face on which protrusions are formed with the same protruding length so that a groove having a plurality of curves is provided between said protrusions, and wherein said end face of said base portion of said seal member is brought into abutment with an inner face of said cover to form therebetween said cooling air flow path which has the shape of a labyrinth.

5. The automotive alternator as set forth in claim 4, wherein an end face of said extension portion of said seal member is partially brought into abutment with said inner face of said cover to form said water shield.

6. The automotive alternator as set forth in claim 5, wherein said water shield has an extension path formed therein which has an open end and a closed end, and wherein said extension path extends from said closed end to said open end across said entrance of said cooling air flow path, so that said cooling air flow path communicates with said extension path at a place close to said closed end of said extension path, and said open end of said extension path and said entrance of said cooling air flow path open in different directions.

* * * * *